Aug. 22, 1933.  C. H. NIEDERHAUSER  1,923,793
ACTIVITY ANALYSIS AND RECORDING DEVICE
Filed Feb. 19, 1932   2 Sheets-Sheet 1
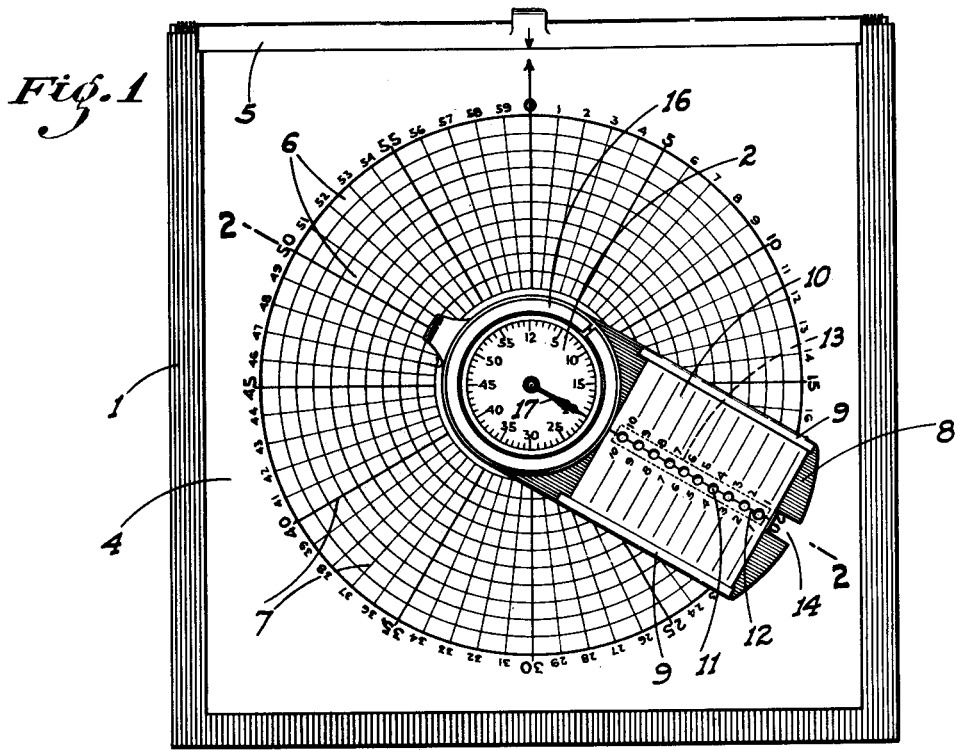
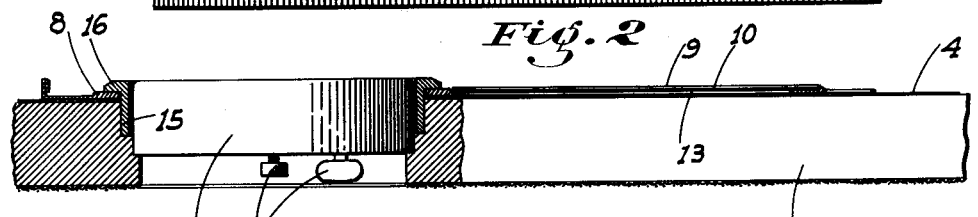
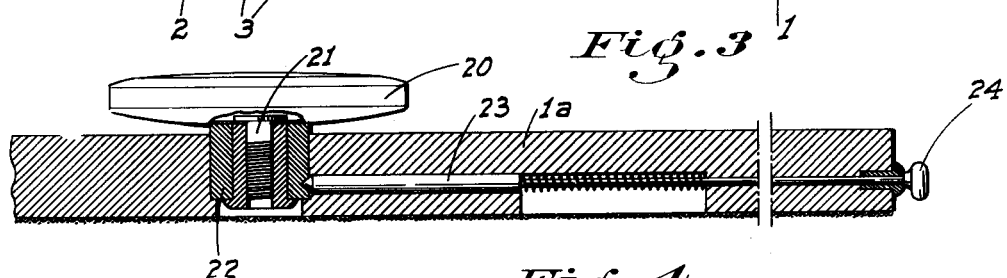
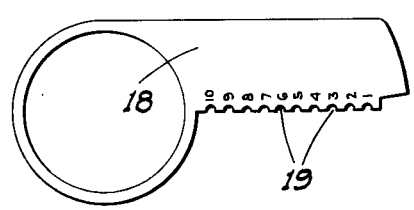
INVENTOR
C. H. Niederhauser
BY
ATTORNEY Aug. 22, 1933.  C. H. NIEDERHAUSER  1,923,793
ACTIVITY ANALYSIS AND RECORDING DEVICE
Filed Feb. 19, 1932  2 Sheets-Sheet 2
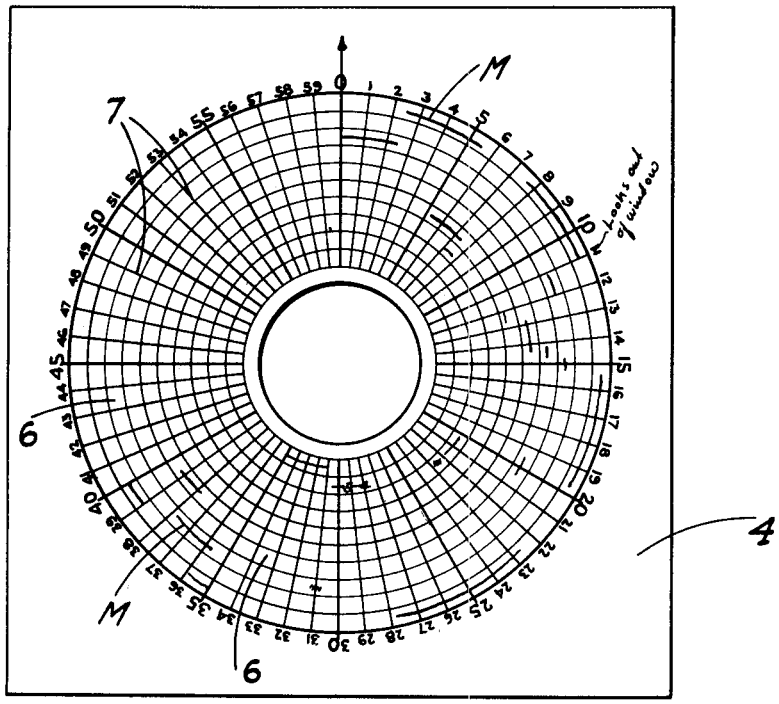

Patented Aug. 22, 1933

1,923,793

UNITED STATES PATENT OFFICE 1,923,793

ACTIVITY-ANALYSIS AND RECORDING DEVICE

Charles H. Niederhauser, Palo Alto, Calif.

Application February 19, 1932
Serial No. 594,019

9 Claims. (Cl. 234—36)

This invention relates to devices for use in connection with recording, analyzing and studying activities such as various physical operations and processes of industry, factories, schools, the study of psychology etc. to determine the efficiency and other features of such operations and processes or of the subject performing the same.

In conducting such analyses it is now customary to use a stop watch which must be started and stopped in the beginning and end of each phase of the activity. With such a method it is hard to keep proper track of the many different phases of the activity which may exist and which it may be desired to record and analyze; especially if such phases take place in a continuous sequence as they are very apt to do. It is also hard to obtain even reasonable time accuracy, since the operator has to note both the activity and the stop watch as well as make notes all at the same time.

The principal object of my invention is to eliminate the defective and unsatisfactory features of the above present method of operation by providing a device by means of which a more accurate and comprehensive record may be easily made of a large number of activity phases; and in a very simple manner so that no training is needed in learning to operate the device and there is little chance for errors being made.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a face view of the device as in operation.

Fig. 2 is a fragmentary cross section as on the line 2—2 of Fig. 1.

Fig. 3 is a similar view showing a modified means of mounting the time piece.

Fig. 4 is a plan view of the movable transfer index.

Fig. 5 is a plan view of a recording sheet after use.

Fig. 6 is a plan view of an index card as inscribed for use.

Referring now more particularly to the characters of reference on the drawings, and particularly at present to Figs. 1, 2 and 4, the numeral 1 denotes a flat board substantially square in form having a circular opening through the middle of its area into which a time piece such as a small round clock 2 is partially depressed with a tight non-turning fit. The extent to which the clock is depressed relative to the thickness of the board is such that the winding and setting members 3 of the clock do not project below the bottom level of the board. The clock is set so that the top of its dial faces the top edge of the board.

The clock forms a centralizing means for a centrally orificed sheet 4 of heavy paper or light cardboard which is adapted to removably rest on the board. This sheet is held rigidly in place by any suitable means such as a spring clip bar 5 mounted along the upper edge of the board, as shown, or by thumb tacks or the like. The sheet is printed with a plurality of concentric circles forming circular spaces therebetween; and with radial lines 7 corresponding to and alined with the minute spacings on the clock dial. There are thus sixty of these lines which are correspondingly numbered about the outermost circle, and there are as many of the spaces 6 as experience has deemed to be desirable.

Also, centered on and turnable relative to the clock to move about the sheet is a radially projecting flat holder 8 preferably of a suitable kind of metal. This holder has side flanges 9 for removable holding engagement with an index card 10 of cardboard or other suitable material; the holder and card together forming what I term a movable recording index. The card is provided with a row of stylus receiving openings 11 which are centered on a line 12 printed on the card radial with the clock; said openings being also centered in the different spaces 6 of the sheet. To permit the contact of a pencil or other marking stylus with the sheet below, the holder 8 is provided with a slot 13 under and extending along the row of openings 11.

These openings are numbered on opposite sides, with the same numbers but in different colors and with lines opposite the numbers, as shown, so as to guide the user in writing the names of the various activities or phases of the same being checked or analyzed. The holder plate 8 at its outer end is provided with an open ended recess 14 which extends to adjacent the outermost circle on the sheet and the minute numbers thereon, which recess provides a guide for any notations which the operator may wish to make on the marginal portion of the sheet at any precise moment.

The sheet and holder must both be removable from about the clock in order to enable different sheets to be placed on the board. I may mount these members directly on the casing of the clock or I may use a slip expansible band 15 which is depressed in the board about the clock and projects through the holder and sheet opening; and having a top outwardly projecting flange 16 overhanging the holder about the central opening. In this manner the holder is prevented from being accidentally removed but upon compressing the band about the clock (from which it is normally spaced somewhat) it may be easily removed from its groove or socket in the board, whereupon the holder and sheet may of course be likewise removed.

In operation the sheet 4 is first placed in position on the board with the lines 7 and the minute figures thereon alined with and in corresponding positions to those of the clock. An index card 10 is inserted in the holder and inscribed with the names of the activities or phases of the same which are to be analyzed, and the minute hand 17 of the clock is set to 12 which is considered the conventional starting point. With the board held in one hand and with a pencil or the like in the other the operator watches the progress of the activity and as each phase of the same starts or finishes he makes a mark M on the sheet 4 through the corresponding index opening 11 which will be either in the form of a point or a line depending on the length of time of the activity.

In connection with such marking the operator of course moves the index around the sheet in conformity to the passage of time as indicated by the clock, it being an easy matter to move and maintain the index in proper radial alinement with the minute hand on account of the presence of the radial line 12 on the card, and the row of holes 11 centered on said line.

If activities or phases to a greater number than there are holes 11 are being noted, the names of such extra phases are inscribed on the card on the opposite side of those first inscribed and marks are made on the sheet as required by a pencil colored differently from that used with the first set of phases. In this manner there is no confusion as to which even though the marks for the two sets of phases are in the same sheet space.

A simple example of the use of and operation of the device is shown in Figs. 5 and 6 which represent the actual observation of a boy in a school reported by the teacher as doing poor work. The observer of course has his seat in view of the boy and watches his various activities during the class period, inscribing the various activities of the boy on the index card 10 as they occur. The series of marks M made on the sheet 4 during this period, in connection with the index, clearly show that only sixteen minutes out of the forty were spent in study while the remaining time was spent in a variety of wasteful or annoying activities the nature of which are of course disclosed by the card 10 and the duration of which are evidenced by the length of the corresponding markings on the sheet.

After a complete record of the activity has been made on the sheet the recording index is removed and replaced by a transfer index card 18 which is also turnably mounted on the clock or band 15 as the case may be. One edge of the card lies on a line radial with the clock and said edge is indented with notches 19 of the same number and spaced the same as the openings 11 in the card 10. These notches have numbers alongside corresponding to those printed adjacent said openings 11.

By means of this transfer card the marks previously made in the different circular spaces on the sheet may be easily followed up and the results indicated by such marks may be noted in tabulated form on another sheet for future study. For instance, all entries in any circular space on the sheet may be entered in a single column or line of said other sheet with the times at which said entries are made as shown by the minute figures on the sheet.

Instead of mounting a clock on a board a watch 20 may be used, as in Fig. 3. In this case the back of the watch case is rigidly secured by a screw 21 in connection with a bushing 22 removably recessed into the board 1—a; the recording sheet and index holder turning on the upper portion of the bushing. To hold the bushing against removal and to maintain the watch in its proper position said bushing is provided on one side with a notch adapted to be engaged by the adjacent end of a spring pressed catch rod 23 which is mounted in the board and extends radially from the bushing to a pull knob 24 disposed outwardly of one edge of the board.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A recording device comprising a board, a timepiece mounted thereon, a recording sheet adapted to rest on the board in surrounding relation to the timepiece, said sheet having a plurality of lines concentric with the timepiece and defining circular spaces therebetween and lines radial with the timepiece and spaced corresponding to the minute spacings of the dial of the timepiece, and a member turnable axially of the timepiece and overlying the sheet; said member being provided with stylus-receiving openings alined with the different circular spaces on the sheet.

2. A recording device comprising a board, a timepiece mounted thereon, a recording sheet adapted to rest on the board in surrounding relation to the timepiece, said sheet having lines radial with the timepiece and spaced corresponding to the minute spacings of the dial of the timepiece, and a member turnable axially of the timepiece and overlying the sheet, and a line imprinted on said member radial with the timepiece; the member having stylus receiving openings centered on said line and alined with the different circular spaces on the sheet.

3. A recording device comprising a board, a time-piece mounted thereon, a recording sheet adapted to rest on the board in surrounding relation to the timepiece, said sheet having lines radical with the timepiece and spaced corresponding to the minute spacings of the dial of the timepiece, and a member turnable axially of the timepiece and overlying the sheet; and index card having stylus-receiving openings to aline with the circular spaces on the sheet, and means to support said card in radial relation to the timepiece for movement about the axis thereof and in superimposed relation to the sheet.

4. A structure as in claim 1, in which means is provided to removably hold said member in position relative to the timepiece without interfering with the rotation of said member.

5. A structure as in claim 1, with a split expansion band partly depressed in the board in surrounding and spaced relation to the timepiece, and projecting through the central portion of the member, and a flange projecting outwardly from the band in overhanging relation to said central portion.

6. A recording device comprising a board, a timepiece mounted thereon, a recording sheet to rest on the board in surrounding relation to the timepiece, a flat member overlying the sheet and turnably mounted axially of the timepiece, parallel flanges along and overlying the sides of said member, and an index card removably supported on the member and engaged by the flanges, said card having stylus openings arranged in a row along a line radially of the timepiece; the member having a slot alined with said openings.

7. A recording device comprising a board, a timepiece mounted thereon, a recording sheet to rest on the board in surrounding relation to the timepiece, an index card having stylus openings arranged in a row, a holder for the card, and means removably mounting the holder in turnable and axial relationship with the timepiece.

8. A device as in claim 7, with means on the holder and engaging the card to maintain the latter in position such that the row of stylus openings is radially alined with the timepiece.

9. A device to facilitate the reading of marks recorded on a sheet in concentric rows and in circumferentially spaced order thereon, said device comprising a flat element, and means to mount said element in connection with the sheet for rotative movement about the axis of said rows of marks; one edge of said element being radial with said axis and extending outwardly past all the rows of marks, said edge having notches cut therein alined with the different rows of marks.

CHARLES H. NIEDERHAUSER.